Figure 7:
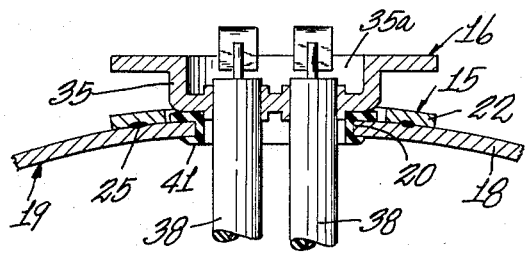

Dec. 31, 1963
L. D. DRUGMAND
3,116,402
ELECTRIC HEATERS
Filed Aug. 11, 1960
2 Sheets-Sheet 1
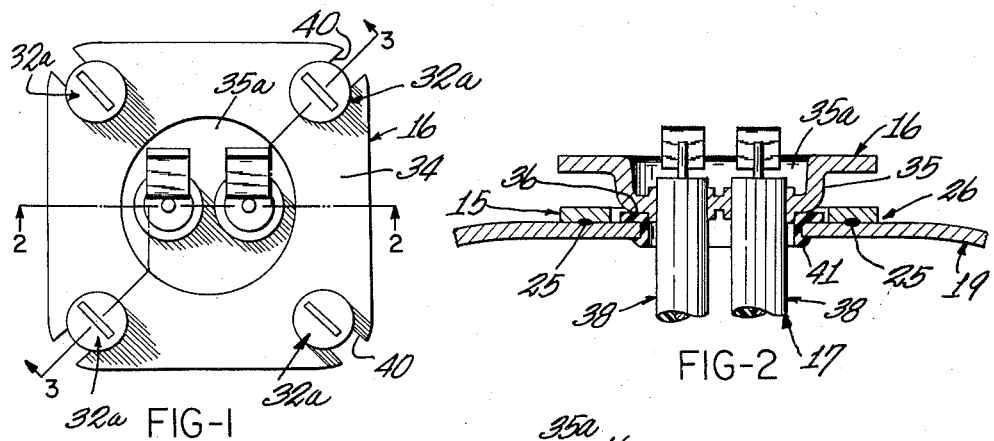
FIG-1
FIG-2
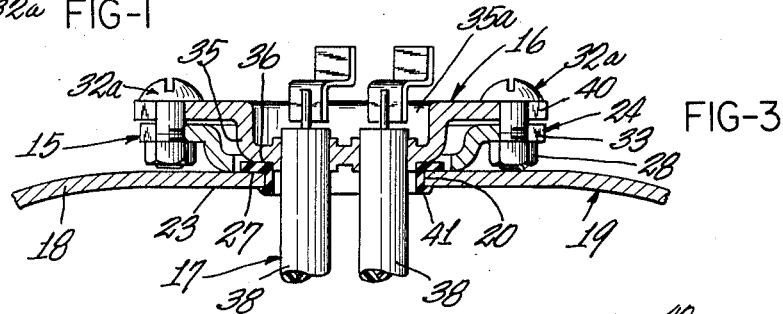
FIG-3
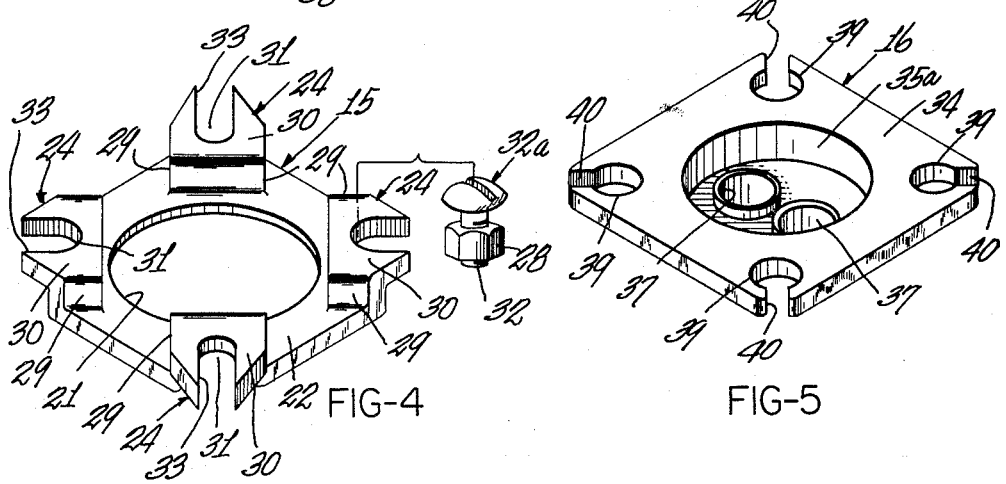
FIG-4
FIG-5
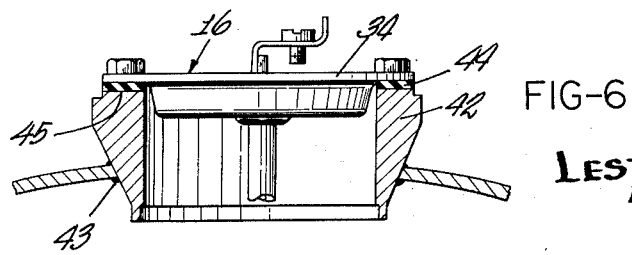
FIG-6
*INVENTOR.*
LESTER D. DRUGMAND
BY
*ATTORNEY*

INVENTOR.
LESTER D. DRUGMAND
BY
ATTORNEY 3,116,402
ELECTRIC HEATERS
Lester D. Drugmand, Pittsburgh, Pa., assignor to Edwin L. Wiegand Company, Pittsburgh, Pa.
Filed Aug. 11, 1960, Ser. No. 49,095
1 Claim. (Cl. 219—38)

My invention relates to electric heaters, more particularly to hot water heaters, and the principal object is to provide new and improved heaters of this character.

Reference is made to my co-pending application of the same title, Serial No. 34,723, filed June 8, 1960, of which this is an improvement. The present invention further reduces cost in the production of an efficient hot water heater by the use of parts which can be mass produced and by means which eliminate costly assembly operations.

Figure 8:
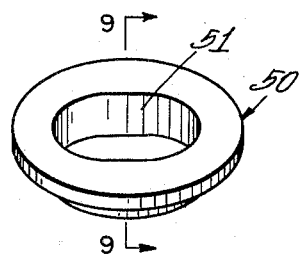
Figure 11:
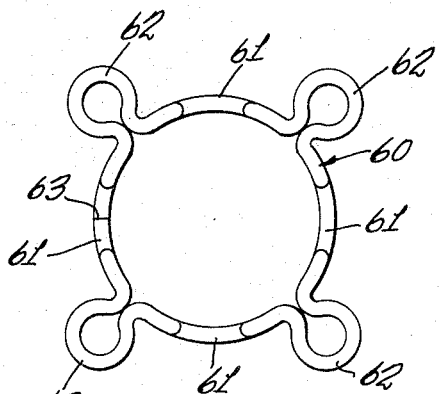
Figure 9:
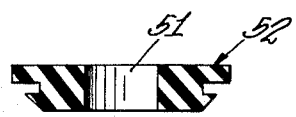
Figure 12:
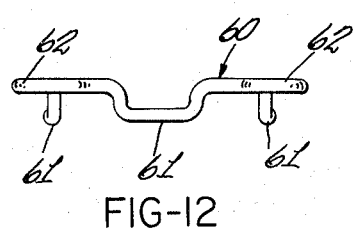
Figure 10:
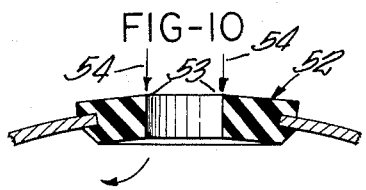

In the drawing accompanying this specification and forming a part of this application, there is shown, for purposes of illustration, an embodiment which my invention may assume, and in this drawing:

FIGURE 1 is a plan view of an electric immersion heater,

FIGURES 2 and 3 correspond, respectively, to the lines 2—2 and 3—3 of FIGURE 1,

FIGURES 4 and 5 are perspective views of parts of the embodiment,

FIGURE 6 is a sectional view, with parts in elevation, disclosing how the construction may be combined with collars of prior use, FIGURE 7 is a view similar to FIGURE 2, but showing a slightly different embodiment, FIGURE 8 is a perspective view of a gasket which may be used in the disclosed embodiment, FIGURE 9 is a sectional view corresponding generally to the line 9—9 of FIGURE 8, FIGURE 10 is a sectional view similar to FIGURE 9 but showing a slightly different gasket, and FIGURES 11 and 12, respectively, are plan and side views of a different embodiment of my invention.

Referring to FIGURES 1 through 5, the embodiment of the invention therein disclosed comprises a fitting 15 and a flange 16 which combine to removably support an electric heating element 17 to the wall 18 of a tank 19. The tank 19 may contain a fluid, such as water, and the active heating portion (not shown) of the heating element 17 extends through an opening 20 in the tank wall and is disposed within the tank to heat its contents.

The fitting 15 is made of rigid material, preferably of metal such as cold rolled steel. The fitting is preferably formed as a stamping, and it has been found that eleven gauge sheet may be formed to the desired shape and will provide the required strength.

Referring particularly to FIGURE 4, the fitting 15 has a central opening 21 and parts surrounding the opening at different levels. More particularly, the parts in one level, which may be termed the lower level with reference to the position of parts in the drawings, are disposed in a generally flat portion 22 in which the opening 21 is also formed. The term "flat" portion is meant to include slight deviations from a perfectly flat condition, as will be apparent later. In some cases, as shown in FIGURES 2 and 3, the wall of the tank is flattened, as seen at 23, and this may be done at the time the opening 20 is punched.

The fitting parts at the other level (the upper level with reference to the drawings) are offset with respect to the parts in the flat portion, and provide pockets or sockets 24 which are here shown to be four in number and equally spaced about the axis of the fitting opening 21. The lower level parts between adjoining pockets 24 are thus disposed within the flat portion 22 and these four parts may be spot-welded, as shown at 25, to the exterior surface of the tank wall to align the openings 20 and 21 and to provide a very strong connection between the fitting and the tank. The fitting 15 may, of course, be secured to the tank in any other suitable manner, such as by arc welding along the edge area denoted by the numeral 26 in FIGURE 2, or by fastening screws or rivets which pass in fluid-tight relation through openings in the fitting and tank wall. However, spot-welding is preferred because of the neatness and strength of the connection and because the welding may be rapidly accomplished.

As seen in FIGURES 2 and 3, the opening 20 in the tank wall is considerably smaller than the opening 21 in the fitting 15, to provide a circular land or gasket surface 27. With the fitting 15 rigidly secured to the tank wall, the pockets 24 open toward but are spaced from the adjacent exterior surface of the tank wall, and each pocket is adapted to receive a polygonal head or nut 28, the opposite side walls 29, 29 of the pocket being preferably spaced a sufficient distance to engage opposed flats on the nut 28 and thus prevent the latter from turning.

The bottom wall 30 of each pocket 24 has an aperture 31 for passing the shank 32 of a screw 32a providing a second head spaced from said polygonal head, and preferably each aperture 31 communicates with a slot 33 leading to the side edge of the pocket so the screw shank 32 may be moved into its aperture by movement edgewise of the fitting 15. The bottom wall 30 of each socket is spaced from the tank wall an amount to restrict axial movement of the head 28.

The flange 16 is preferably made of a material which will resist corrosion caused by contact with the fluid in the tank and the flange has been made as a brass forging with good result. The flange has a flat portion 34 and a central, inwardly dished portion 35, having a bottom wall which provides a gasket surface 36 adapted to be disposed in opposed spaced relation with the gasket surface 27 of the tank wall.

The bottom wall of the dished portion 35 is here shown as formed with a pair of apertures 37, 37 through which extend in fluid-tight relation the terminal portions 38, 38 of a sheathed electric heater. In the present case the heater is of hair-pin shape, such, for example, as shown in the patent to H. C. Dicome, No. 2,810,815. The dished portion 35 of the flange provides a circular recess 35a which may be filled with a suitable epoxy resin (not shown) to seal the exposed ends of the heater terminal portions, or a terminal block (not shown) may be disposed in the recess and about the terminal portions, all as well known in the art.

The flat portion 34 of the flange 16 is preferably square and is formed with four corner apertures 39 which are alignable with the apertures 31 of the fitting 15. Each aperture 39 communicates with a slot 40 which leads to the side edge of the flange so that the screws 32a, with nuts 28 started thereon, may be moved into aligned apertures 31, 39 by edgewise movement through aligned slots 33, 40.

A gasket 41 of any suitable compressible material, such as neoprene or silicone rubber, is disposed between facing gasket surfaces 27 and 36 and is compressed therebetween when the head of the screws 32a are turned to thread the shanks 32 into respective nuts 28. The fitting 15 and flange 16 are drawn together between the screw head and nut and the parts may be so proportioned that facing surfaces of the pockets 24 and flat flange portion 34 abut when the screws have been pulled down far enough to properly compress the gasket, thus to avoid injury to the gasket or displacement thereof.

The gasket in FIGURES 2 and 3 is ring-shaped and of trough-like cross-section to envelop all surfaces around the tank wall opening and thus minimize the amount of surface of the flange 15 which is exposed to contact with the fluid in the tank so that the anode usually present in the tank is not wasted away too rapidly by galvanic action.

Many of the tanks are enameled on the inside to minimize corrosion and it has been found that the enamel tends to burn off the sharp edges at the tank opening and thus this part of the tank is subject to corrosion. However, because of the trough-like cross-section of the gasket 41, the gasket wraps around and covers these edges to reduce corrosion thereat.

The flange 16 and heater carried thereby may be used as a replacement for a heater removed from a collar-type fitting 42, as seen in FIGURE 6, to increase utility of the invention. The fitting is a forging and is welded within the tank wall opening by a fluid-tight weld 43. A gasket 44 is disposed between the undersurface of the flat portion 34 of the flange 16 and a gasket surface 45 of the collar 42.

In FIGURE 7, the tank wall has not been flattened around the tank opening but because of the relatively large diameter of the tank, the curvature is negligible. However, it is preferred in some cases to curve the flat portion 22 of the fitting 15 so as to more nearly match the flat portion to the tank. Hot water tanks are usually from fourteen to twenty inches in diameter and the curvature of the fitting portion 22 in FIGURE 7 may be an average between these extremes, so that one fitting will accommodate all tank sizes. As before pointed out, the curvature of the portion 22 is slight and is included in any use herein of the term "flat," and the reverse is also true.

FIGURES 8 and 9 illustrate a modified gasket 50 which may be used in place of the gasket 41. The main change in the gasket 50 is that its opening 51 is longer than wide with rounded ends. The gasket surface defining the opening 51 closely passes the heater leg portions 38, 38 so that the gasket is frictionally retained on the heater during handling or transportation of the heater and flange portion of the connection.

The gasket 52 in FIGURE 10 is similar to gasket 50 with the exception that it has high points 53, 53 disposed adjacent to the curved portions of the tank wall, these high points being first engaged by the gasket surface 36 of the flange 16 and inward pressure as designated by the arrows 54 of the gasket surface, when the fastening screws are tightened, will cause gasket portions in line with the high places to roll around the lip of the tank opening, as suggested by arrow 55, to tightly seal about the tank opening lip.

FIGURES 11 and 12 disclose a fitting 60 which in certain respects will accomplish the purpose of the fitting 15. In this embodiment, the fitting is made of wire which may be round or square in cross-section. It has been determined that wire one-eighth inch in diameter ought to provide satisfactory results.

As shown, the wire fitting 60 has parts at different levels, as before, the lower parts 61 being adapted to be connected to the tank wall, as by spot-welding or the like. In this case, and in the case of the previously disclosed embodiment, projections may be formed in the parts at the lower level to permit either fitting to be projection welded to the tank wall.

The parts 62 at the upper level are spaced from the tank wall when the fitting 60 is connected thereto and such parts form eyes through which the shanks of the fastening screws pass. The fitting 60 may be formed from a single piece of wire to produce the parts at different levels and the eyes, and the ends of the wire may be welded at their meeting point 63.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; thence it will be appreciated that the herein disclosed embodiments are illustrative only, and that my invention is not limited thereto.

I claim:

A fluid-tight connection at the opening in the wall of a fluid tank and between said wall and a sheathed electric immersion heater, comprising a metal stamping having a generally flat central portion with an opening therethrough, said central portion being connected flatwise to said tank wall with its opening aligned with the tank wall opening, said stamping having a plurality of spaced peripheral portions offset from said flat portion and each providing a socket, each socket being defined by a pair of oppositely arranged side walls and a wall spanning said side walls and generally parallel to said tank wall, a fastening element for each socket having a polygonal head, a threaded shank, and a second head spaced from said polygonal head, one of such heads being threaded on said shank so that said heads are movable toward and away from each other by proper rotation of said shank, said polygonal head being disposed within a respective socket and it and the socket side walls being related so that side portions of said polygonal head engage said side walls to hold it against turning, the thickness of said polygonal head and the spacing of said spanning wall from said tank wall being related so that axial movement of said polygonal head is restricted, each socket having an open end slot in said spanning wall so that the respective polygonal head may be positioned within its socket by sidewise movement of the shank through a respective slot, a flange having a central opening through which said heater sheath extends in fixed fluid-tight manner, said flange overlying said stamping to position the active heating portion of said electric heating portion of said electric heater through the aligned openings in said stamping and said tank wall and within the interior of said tank, said flange having holes corresponding to and aligned with the slots in said sockets to pass respective shanks of said fastening elements, said second head of each of said fastening elements overlying said flange whereby when the spaced heads of the fastening elements are drawn together by shank rotation said flange is drawn toward said stamping, and a gasket which is compressed when said flange is drawn toward said stamping a predetermined amount to seal said tank opening.

References Cited in the file of this patent

UNITED STATES PATENTS

| | | |
|---|---|---|
| 1,432,243 | Harris | Oct. 17, 1922 |
| 1,742,052 | Anderson | Dec. 31, 1929 |
| 2,613,312 | Thurston | Oct. 7, 1952 |
| 2,618,731 | Bremer | Nov. 18, 1952 |
| 2,768,012 | Klingler | Oct. 23, 1956 |

FOREIGN PATENTS

| | | |
|---|---|---|
| 1,072,084 | France | Sept. 8, 1954 |